United States Patent
Talmadge et al.

(10) Patent No.: US 7,039,080 B1
(45) Date of Patent: May 2, 2006

(54) SYSTEM AND METHOD FOR PROPORTIONAL CONTROL OF MULTIPLE PUMP LASERS

(75) Inventors: Paul C Talmadge, Ansonia, CT (US); Eric B. Saint Georges, Cupertino, CA (US)

(73) Assignee: Tellabs Operations, Inc., Naperville, IL (US)

( * ) Notice: Subject to any disclaimer, the term of this patent is extended or adjusted under 35 U.S.C. 154(b) by 471 days.

(21) Appl. No.: 10/209,525

(22) Filed: Jul. 30, 2002

Related U.S. Application Data

(60) Provisional application No. 60/308,940, filed on Jul. 30, 2001.

(51) Int. Cl.
*H01S 3/13* (2006.01)

(52) U.S. Cl. ............................. 372/29.021; 372/29.02

(58) Field of Classification Search ................. 372/29; 359/337, 341, 341.3
See application file for complete search history.

(56) References Cited

U.S. PATENT DOCUMENTS

| | | | | |
|---|---|---|---|---|
| 5,710,660 A * | 1/1998 | Yamamoto et al. | ..... | 359/341.44 |
| 6,366,393 B1 * | 4/2002 | Feulner et al. | .............. | 359/337 |
| 6,483,630 B1 * | 11/2002 | Kosaka | .................. | 359/337.11 |
| 6,525,873 B1 * | 2/2003 | Gerrish et al. | ........... | 359/341.4 |
| 2003/0002141 A1 * | 1/2003 | DeCasatis et al. | ..... | 359/337.11 |

* cited by examiner

*Primary Examiner*—Thuy V. Tran
*Assistant Examiner*—Hung Tran Vy
(74) *Attorney, Agent, or Firm*—Baker Botts L.L.P.

(57) ABSTRACT

Optical energy is provided to an optical amplifier by a first and a second pump laser. The optical energy that is provided is used as a basis for generating a gain associated with the optical amplifier. An error associated with the first pump laser may be identified. One or more parameters associated with the second pump laser may be controlled in response to the error such that the second pump laser increases an optical power output provided to the optical amplifier to compensate for the full or partial failure of the first pump laser. The adjustment in optical power output is used by the optical amplifier to substantially maintain the gain associated with the optical amplifier.

15 Claims, 2 Drawing Sheets

SYSTEM AND METHOD FOR PROPORTIONAL CONTROL OF MULTIPLE PUMP LASERS

RELATED APPLICATIONS

The present application claims benefit to U.S. Provisional Application No. 60/308,940 dated Jul. 30, 2001.

TECHNICAL FIELD OF THE INVENTION

This invention relates in general to the field of optical communications and more particularly to a system and method for proportional control of multiple pump lasers.

BACKGROUND OF THE INVENTION

Optical communications have become increasingly important in today's society. Optical networks generally include communication systems that may use light waves as a medium for the transmission or switching of data or information. Optical communication systems have enjoyed sustained notoriety because of their ability to provide cost-effective bandwidth, noise isolation capabilities, greater security, and a small physical presence.

One drawback associated with some optical networks is that when an element within the network architecture experiences a failure, the entire communication system (or any segment thereof) may break down or become inoperable. This vulnerability is due to a lack of redundancy or failover protections provided to a network architecture. These failures may be particularly detrimental in cases where numerous components or elements depend on an upstream functionality in order to function properly. In such a scenario, the failure of one component produces inefficiencies and or errors that result in poor or inadequate performance for the network. Additionally, significant problems may be presented for components or elements that are positioned downstream of the failure, components that may be relying on the failing component to provide some current, voltage, power, signal, operation, or other suitable output.

SUMMARY OF THE INVENTION

From the foregoing, it may be appreciated by those skilled in the art that a need has arisen for an improved operational approach associated with an optical network. In accordance with one embodiment of the present invention, a system and method for proportional control of pump lasers are provided that substantially eliminate or greatly reduce disadvantages and problems associated with conventional optical communication techniques.

According to one embodiment of the present invention, there is provided a method for proportional control of multiple pump lasers that includes providing optical energy to an optical amplifier with a first and a second pump laser. The optical energy that is provided is used as a basis for generating a gain associated with the optical amplifier. An error associated with the first pump laser may be identified. One or more parameters associated with the second pump laser may be controlled in response to the error such that the second pump laser increases an optical power output provided to the optical amplifier. The optical power output is used by the optical amplifier to substantially maintain the gain associated with the optical amplifier.

Certain embodiments of the present invention may provide a number of technical advantages. For example, according to one embodiment of the present invention, a failure approach is provided that allows multiple pump lasers to be used in a parallel mode. This parallel operation may operate to extend the life of the pump laser because each of the pump lasers may be controlled in order to set an optimal level for the amount of pump power needed for a given system. This feature provides for more consistent operation of the pump lasers, greater efficiency in providing pump power to a suitable element or component, and decreased stress on a corresponding pump laser.

Another technical advantage associated with one embodiment of the present invention relates to the ability to maintain continuous operations in an optical network that experiences a pump laser failure. This is due to the use of multiple pump lasers that may be changed or removed from an architecture without shutting down the associated system or without losing communications traffic. This capability offers a redundancy to the optical network in cases where a failure occurs. In addition, this flexibility allows for enhanced efficiency and reduced error generation for a corresponding optical network architecture because of the ability to easily change a pump laser without interrupting the continuity of system operations. Embodiments of the present invention may enjoy some, all, or none of these advantages. Other technical advantages may be readily apparent to one skilled in the art from the following figures, description, and claims.

BRIEF DESCRIPTION OF THE DRAWINGS

To provide a more complete understanding of the present invention and features and advantages thereof, reference is made to the following description, taken in conjunction with the accompanying figures, wherein like reference numerals represent like parts, in which.

DETAILED DESCRIPTION OF THE INVENTION

Figure 1:
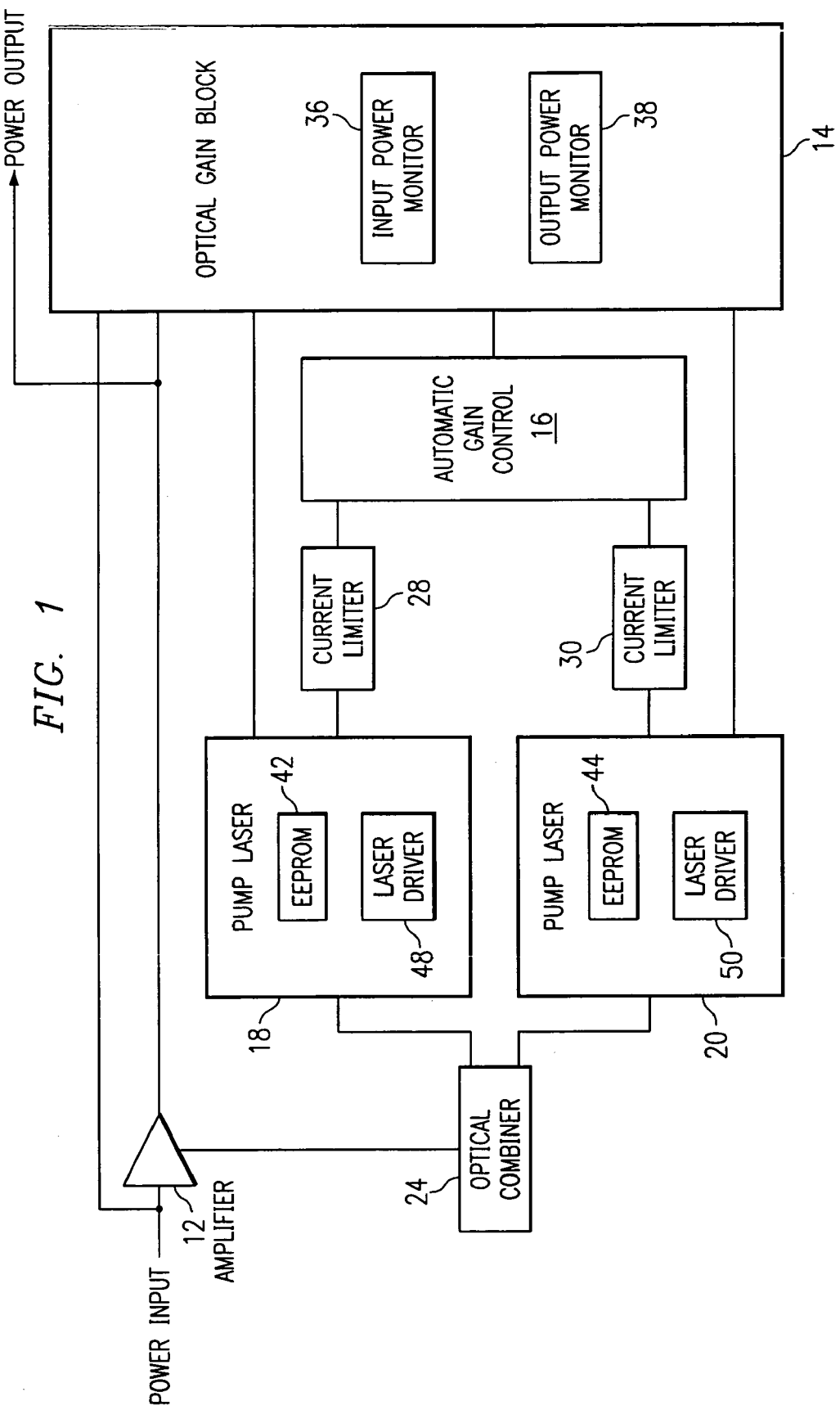
FIG. 1 is a simplified block diagram of an optical communication system.

FIG. 1 is a simplified block diagram of an optical communication system 10 in accordance with one embodiment of the present invention. Optical communication system 10 includes an optical amplifier 12, an optical gain block 14, an automatic gain control 16, and pump lasers 18 and 20. Additionally, optical communication system 10 includes an optical combiner 24 and a set of current limiters 28 and 30. A suitable combination of one or more of these elements may be collectively referred to as a 'feedback loop' or 'feedback control loop' that is operable to provide a predetermined power output based on input received by optical amplifier 12. Optical communication system 10 may be positioned at any suitable location within or external to an optical network in order to facilitate the delivery, transmission, or switching of optical information or data in an optical communications environment.

In accordance with the teachings of the present invention, optical communication system 10 provides for the operation of multiple pump lasers 18 and 20 in order to account for the occurrence of a failure or an error in the functionality of either of pump lasers 18 and 20. A failure in either of pump lasers 18 and 20 may include a total failure or a partial failure where either of pump lasers 18 and 20 become capable of only outputting less than a total or desired energy than previously able to provide. After a pump laser error is detected, a selected one of pump lasers 18 and 20 may be adjusted in order to account for the error and may further maintain continued operations by generating a suitable output power to be communicated to optical combiner 24 and received by optical amplifier 12. Optical amplifier 12 may continue with normal operations after the occurrence of a pump laser failure and furthermore continue to function properly because of the control exercised by optical gain block 14 and automatic gain control 16 in managing a power output associated with each of pump lasers 18 and 20.

This redundancy provides considerable flexibility to optical communication system 10 in that a pump laser failure may occur without inhibiting the entire operation of a corresponding system. In addition, each of pump lasers 18 and 20 may provide enhanced flexibility because each may be removed when a failure occurs without experiencing a discontinuity in system operations. Thus, optical communication system 10 does not have to be shut down, switched off, or made susceptible to the loss of communications traffic as any selected pump laser 18 and 20 may be removed and replaced without interrupting system operations.

Additionally, the implementation of a suitable feedback control loop provides a management feature or failover element for operations associated with optical amplifier 12. The feedback control loop may be utilized by optical amplifier 12 to maintain a steady state in attempting to generate a desired or targeted power output. The feedback control loop may manage or otherwise control operations associated with pump lasers 18 and 20 either directly or indirectly such that a pump failure does not create a detrimental effect for an associated network architecture. A feedback control loop may ensure that optical amplifier 12 provides a consistent specified gain. The gain may be based on specific needs or selected based on a theoretical computed gain.

Optical amplifier 12 is an element that receives optical energy and uses the feedback control loop in order to generate a power output signal. Optical amplifier 12 may receive a portion of a power input from any suitable location. This input may be properly combined with a power input from optical combiner 24 in order to produce an adequate amplifier gain. Optical amplifier 12 may detect, regenerate, amplify, or otherwise modify an incoming power signal in order to produce a selected or predetermined power output to be communicated to an appropriate next destination. Optical amplifier 12 may also be referred to as a 'repeater'0 and may be capable of reproducing an optical signal or any portion thereof generated at any location within an associated optical network. In accordance with one embodiment of the present invention, optical amplifier 12 is an erbium doped fiber amplifier (EDFA). Alternatively, optical amplifier 12 may be any other suitable amplifier, potentially inclusive of a semiconductor material, and adequately doped with any other appropriate element such that an input signal is properly amplified or reproduced and communicated to a suitable destination. A portion of the input to optical amplifier 12 may be supplied by pump lasers 18 and 20 either directly or indirectly. The erbium element within optical amplifier 12 may include state transitions that cause the emission of photons concurrently with the reception of an incoming signal.

Optical amplifier 12 may make appropriate adjustments, in order to provide output, through the power pump lasers 18 and 20 when there is a change experienced in the input power. These adjustments of pump lasers 18 and 20 may be effectuated through operation of the feedback control loop (inclusive of automatic gain control 16). This operation may be performed directly or indirectly with corresponding elements in order to restore or otherwise set the power output of optical amplifier 12 to a targeted value. This designation operates to compensate for changes in input power provided to optical amplifier 12.

The changes in input power provided to optical amplifier 12 may result from an error or a failure of either of pump lasers 18 and 20. Without a system that protects in some way against a failure for an associated feedback control loop, the control loop may become 'open' and lead to an undesirable diversion of the amount of supplied pump power to pump lasers 18 and 20. This in turn may result in severe disruption of data traffic carried by optical communication system 10. If the feedback control loop becomes 'open' and the associated pump power ascends to a maximum level, a downstream receiver or other element may saturate. If alternatively the feedback control loop becomes 'closed' and the pump power moves to a substantially lower power level, data traffic may be interrupted by the lowered power levels provided by optical amplifier 12. Thus, optical communication system 10 may avoid both of these problematic issues with the implementation of optical gain block 14 which may communicate with automatic gain control 16 in order to ensure continued operations if either of pump lasers 18 and 20 experience a failure.

Optical gain block 14 is an element that operates in conjunction with automatic gain control 16 in order to dynamically drive pump lasers 18 and 20 at levels that maintain the desired or the specified optical amplifier 12 output power. Optical gain block 14 may include an input power monitor 36 and an output power monitor 38 where appropriate. Input power monitor 36 and output power monitor 38 allow optical gain block 14 to monitor and detect variations or deviations in the power of the monitored amplifier output signal (e.g. a deviation from what is otherwise a constant gain output of optical amplifier 12). Deviations may be adjusted by controlling pump lasers 18 and 20 through automatic gain control 16. Automatic gain control 16 may increase the voltage supplied to corresponding pump assemblies such that a voltage level is provided that results in the desired optical amplifier 12 output power.

In the event that a power deviation detected by optical gain block 14 is a result of a complete failure of pump laser 18 or pump laser 20, automatic gain control 16 may be used in the adjustment of the voltage supplied to pump lasers 18 and 20 such that the non-failing pump laser may alone provide the desired amplifier output power. This feature offers a potential complete redundancy for optical amplifier 12 because a sufficient power is made available through a single pump laser 18 or 20 in the event that a pump laser failure occurs. In cases where the failure is moderate (e.g. an error that causes a reduction in output for a respective pump laser 18 or 20), optical amplifier 12 may be adjusted accordingly by automatic gain control 16 and automatic gain block 14 such that it returns to a state of normal operation. In this manner, each of pump lasers 18 and 20 may contribute a portion of the total power provided by optical amplifier 12.

Automatic gain control 16 is a feedback element operable to receive one or more signals associated with optical amplifier 12 and to provide feedback data such that one or more parameters may be recorded, modified, or otherwise changed in order to generate a predetermined gain. Automatic gain control 16 may also compute the instantaneous gain of optical amplifier 12 by using information supplied by input power monitor 36 and output power monitor 38. The gain that is computed may be compared by automatic gain control 16 against a targeted or predetermined gain that is supplied to automatic gain control 16 by any suitable element. Differences between the computed instantaneous gain of optical amplifier 12 and the target gain may be eliminated or otherwise reduced by automatic gain control 16 through adjustment of the current supplied to pump lasers 18 and 20.

The current signals may be provided to current limiters 28 and 30 and may be used to drive pump lasers 18 and 20. Current limiters 28 and 30 may also be used to monitor currents provided to pump lasers 18 and 20 to ensure that the supply current does not exceed a maximum threshold that is specified for each of pump lasers 18 and 20. The maximum current thresholds may be provided to current limiters 28 and 30 through signals provided by optical gain block 14 or based on information stored within any suitable memory element such as a memory element stored within pump lasers 18 and 20. The current thresholds may be received by current limiters 28 and 30 and suitably converted to an analog signal format, where appropriate, to be received by pump lasers 18 and 20.

Automatic gain control 16 may adjust one or more currents associated with pump lasers 18 and 20 in a manner whereby the currents are maintained at a level that is below the maximum current capacities specified for each of pump lasers 18 and 20. The maximum current capacities for each of pump lasers 18 and 20 may be stored in any suitable location within optical communication system 10 or provided external thereto. For example, maximum current information may be stored in a suitable memory element and referenced by automatic gain control 16 where appropriate.

Pump lasers 18 and 20 are optical energy generating elements that provide optical energy to optical amplifier 12 such that optical amplifier 12 may produce a target power output. Parameters associated with pump lasers 18 and 20 may be monitored by input power monitor 36 and output power monitor 38 whereby a suitable error message may be generated when current signals associated with pump lasers 18 and 20 fall below a designated value. The measured instantaneous values of the current signal supplied to pump lasers 18 and 20 may be delivered to optical gain block 14 and further evaluated in any suitable manner by input power monitor 36 and output power monitor 38.

Pump laser 18 may include an electrically erasable programmable read-only memory (EEPROM) 42 and a laser driver 48. Similarly, pump laser 20 may include an EEPROM 44 and a laser driver 50. Alternatively, EEPROM 42 and EEPROM 44 may be replaced by any other suitable element, such as an erasable programmable read-only memory (EPROM), a digital signal processor (DSP), a microprocessor, a micro-controller, or any other suitable digital circuitry, memory element, programming element, or storage medium that may be operable to receive one or more error signals and/or data or information associated with parameters of optical communication system 10. EEPROM 42 and EEPROM 44 may be utilized as memory elements that offer a nonvolatile memory that may store data or information associated with a power level needed for each of pump lasers 18 and 20. In addition, EEPROM 42 and EEPROM 44 may include information such as a serial number of each of pump lasers 18 and 20 and data relating to the operation of a corresponding pump module.

The use of pump lasers 18 and 20 in combination with optical amplifier 12 provides flexibility for maintaining network communication operations despite the occurrence of a single point pump laser failure. Each of pump lasers 18 and 20 may include a suitable pump module assembly that is removable and that provides support for each of pump lasers 18 and 20. The individual pump module assemblies may be removed and repaired or replaced while optical communication system 10 is in operation. Such removals or repairs generally do not inhibit the continuous system operations associated with optical amplifier 12. This is due to the continued operation of either pump laser 18 or pump laser 20 that maintains a suitable power output to be provided to optical amplifier 12. This allows a single pump laser 18 or 20 to maintain the requirements needed for optical amplifier 12 to function properly and may further allow for system operations to continue without interruption. Subsequently, the failing or defective pump laser may be suitably replaced whereby the corresponding pump module assembly may be reused or discarded where appropriate and according to particular needs.

Current limiters 28 and 30 may operate to prolong the average life of pump lasers 18 and 20. Each of current limiters 28 and 30 may include any suitable hardware or software operable to limit, restrict, or otherwise dictate a current value. Each of pump lasers 18 and 20 may operate below certain power thresholds that are established through a corresponding pump module and implemented through the use of current limiters 28 and 30. Current limiters 28 and 30 may be coupled to automatic gain control 16 and may receive suitable instructions therefrom that may be used to set one or more parameters associated with pump lasers 18 and 20. The instructions or data may be based on information provided by optical gain block 14 or any other suitable location.

In operation, each of pump lasers 18 and 20 may be used simultaneously in combination to deliver a suitable optical power level provided to optical amplifier 12. Thus, during normal operation, each of pump lasers 18 and 20 may be contributing a portion of the total power provided to optical amplifier 12. Outputs associated with pump lasers 18 and 20 may be communicated to optical gain block 14 for an associated optical amplifier 12. In addition, each of pump lasers 18 and 20 may deliver optical energy to optical combiner 24, where appropriate (instead of delivering optical energy directly to optical amplifier 12), which may suitably process the optical energy such that it may be properly delivered to optical amplifier 12.

Optical gain block 14 may communicate with automatic gain control 16 in order to drive pump lasers 18 and 20 at levels that maintain the desired or the specified optical amplifier 12 output power. Optical gain block 14 may monitor and detect variations or deviations in the power of the monitored amplifier output signal (e.g. a deviation from what is otherwise a constant gain output of optical amplifier 12). Deviations may be adjusted by controlling pump lasers 18 and 20 through automatic gain control 16. Automatic gain control 16 may be used to increase the voltage supplied to a selected pump laser 18 or 20 such that a level is provided that results in the desired optical amplifier 12 output power.

Where there is a power deviation detected by optical gain block 14, automatic gain control 16 may be used in the adjustment of the voltage supplied to pump lasers 18 and 20 such that the non-failing pump module may alone provide the desired amplifier output power. In other cases, where the failure only causes a reduction in output for an associated pump laser 18 or 20, optical amplifier 12 may be adjusted accordingly by automatic gain control 16 and automatic gain block 14 such that it returns to a state of normal operation. In such a state, each of pump lasers 18 and 20 may contribute a portion of the total power provided by optical amplifier 12.

Figure 2:
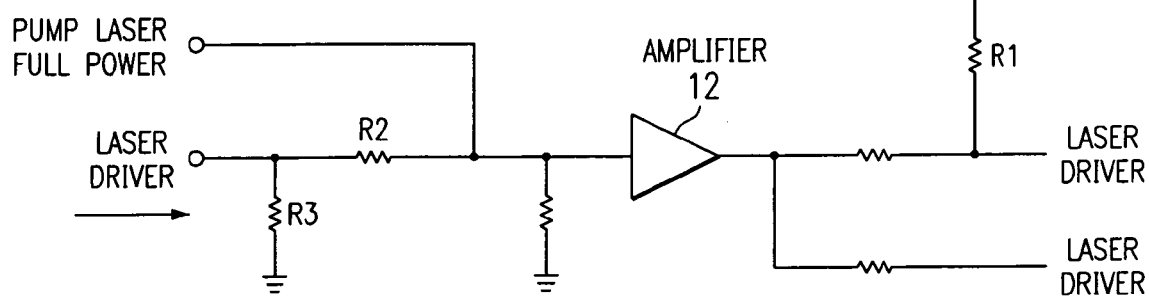
FIG. 2 is a simplified schematic diagram of an example input and an example output circuitry associated with an optical amplifier included within the optical communication system.

FIG. 2 is a simplified schematic diagram of an example input and output circuitry associated with optical amplifier 12. FIG. 2 offers an example implementation or configuration for optical amplifier 12 included within optical communication system 10. In addition, the operation of each of pump lasers 18 and 20 may also be influenced or otherwise affected by the schematic illustrated in FIG. 2. The control voltage supplied equally to each of pump lasers 18 and 20 may allow each of them to be adequately switched to an ON position and to function properly. Pump lasers 18 and 20 may be suitably coupled to the illustrated input and output circuitry in any appropriate manner in accordance with specific gain specifications, designated pump laser parameters, or particular system requirements.

The design illustrated in FIG. 2 may provide for an intentional slight difference between the control voltages that are ultimately supplied to each of pump lasers 18 and 20. This is a result of a resistor (R1) that is selected based on its resistive properties. This slight difference, or imbalance, of control voltages as supplied to pump lasers 18 and 20 may assist in mitigating or avoiding an output power instability that may otherwise occur at lower control voltages if an equal amount of control voltage were simultaneously applied to each pump laser 18 and 20. Because some pump lasers have an appreciable discontinuity or non-linearity characteristic in pump power at lower control voltages, such as at pump laser turn ON or turn OFF for example, the control voltage imbalance created by R1 at lower control voltages provides a finer degree of control over the resultant combined optical amplifier 12 output power. This may also help to mitigate or avoid unwanted discontinuities, such as too much power for example, in the resultant optical amplifier 12 output power. This would occur if, at low control voltages, both pump lasers 18 and 20 were responding to the same control voltage. Such a scenario would result in each of pump lasers 18 and 20 simultaneously turning ON, whereby the combination of even minimum pump laser power outputs may generate more power than desired.

Each of pump lasers 18 and 20 may operate below certain power thresholds that are established through a corresponding pump module and potentially implemented through the use of current limiters 28 and 30. Accordingly, each of the corresponding port modules may include a suitable resistor R2 that is selected to account for this feature. R2 may be chosen to set the desired amount of gain for optical amplifier 12. Another resistor R3 may also be selectively chosen in order to effectuate this goal. The gain of optical amplifier 12 may be evaluated or otherwise set according to the formula R3/(R3+R2). Thus, for a given pump laser 18 or 20, the higher the selected value of R2, the lower the resultant maximum pump laser output power. Each of pump lasers 18 and 20 may be deployed in each corresponding module such that each operate at less than full capacity as a result of R2. R2 may normalize the control voltage that is supplied to a voltage to current converter and further provide for optimal gains for optical amplifier 12.

In this capacity, optical amplifier 12 may act as a voltage follower and as a voltage limiter by limiting the maximum amount of current that is supplied to each of pump lasers 18 and 20. Voltage limiter conditions may be set by constants that are communicated from EEPROM 42 or EEPROM 44. The corresponding memory element (such as EEPROM 42 or EEPROM 44 for example) may be read by automatic gain control 16 which may program a digitally-controlled voltage source that sets the voltage and that provides the limiting voltage for current limiters 28 and 30.

This control voltage may be fed to a suitable current source that drives pump laser 18 and pump laser 20 in a current mode instead of a voltage mode. Alternatively, each of pump lasers 18 and 20 may be driven in a voltage mode where appropriate and according to particular needs. Providing power to a laser diode in a current mode may reduce, if not eliminate, a significant non-linearity that occurs as a result of the exponential voltage turn-on characteristics of a laser diode device. Minimizing this non-linearity, in turn, may provide a laser driver (such as laser drivers 48 and 50) that includes a substantially linear transfer function (error voltage to light output) that may in turn keep the control system in a controlled linear regime. In this regard, a control system may maintain control of the gain of optical amplifier 12 at higher speeds which may be particularly beneficial in certain optical communication systems. For example, this may be beneficial for optical amplifier systems that correct gains of 0.05 decibels per unit or greater to allow for a dynamic configuration such as the adding and dropping of communications channels during continuous operations.

Figure 3:
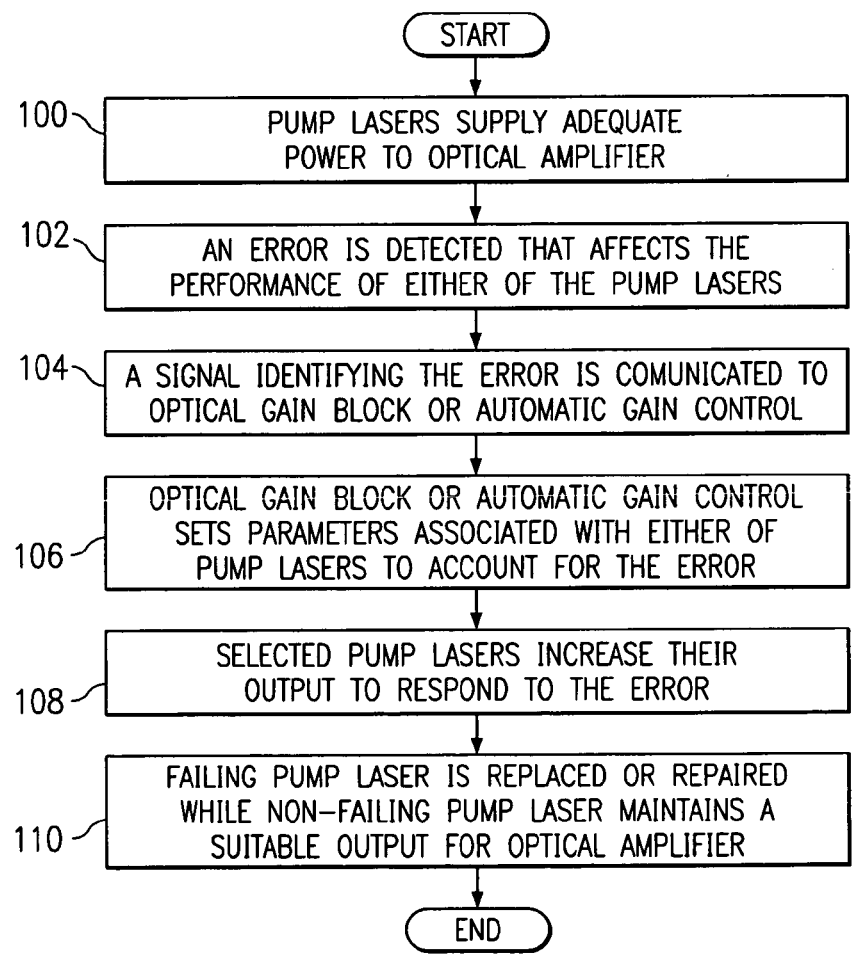
FIG. 3 is a flowchart illustrating a series of example steps associated with a method for proportionally control of multiple pump lasers.

FIG. 3 is a simplified flowchart illustrating a series of example steps associated with a method for controlling an operation associated with a plurality of pump lasers. The method begins at step 100 where a suitable power level is being supplied to optical amplifier 12 by pump lasers 18 and 20. The power level provided by pump lasers 18 and 20 may be identical or different in magnitude. At step 102, an error is identified or otherwise detected by any suitable element within optical communication system 10. At step 104, the error is communicated to either optical gain block 14 or automatic gain control 16. At step 106, either optical gain block 14 or automatic gain control 16 (or both) may respond to the error by setting one or more parameters associated with either (or both) of pump lasers 18 and 20. A selected one or both of pump lasers 18 and 20 may respond accordingly by increasing their outputs that are supplied to optical amplifier 12 such that optical amplifier 12 maintains a selected gain. This is illustrated by step 108. At step 110, the failing pump laser may be replaced or suitably repaired without requiring a system shutdown. The non-failing pump laser may continue to maintain a designated output level until the failing pump laser is remedied.

Some of the steps illustrated in FIG. 3 may be changed or deleted where appropriate and additional steps may also be added to the flowchart. These changes may be based on specific optical system architectures or particular networking arrangements or configurations and do not depart from the scope or the teachings of the present invention.

Although the present invention has been described in detail with reference to particular embodiments, it should be understood that various other changes, substitutions, and alterations may be made hereto without departing from the spirit and scope of the present invention. For example, although the present invention has been described with reference to an EDFA amplifier, any suitable amplifier may be used such that a suitable gain is produced and a constant state associated with the amplifier is maintained. The recovery or restoration methods as described with reference to optical communication system 10 may additionally include any applications for feedback control loops or amplifying systems that depend on one or more internal elements for continued operation or functionality.

In addition, although FIG. 1 illustrates an arrangement of selected elements, such as current limiters and monitoring circuits, numerous other components may be used in combination with these elements without departing from the teachings of the present invention. For example, elements such as optical switches, optical multiplexers, filters, diffraction gratings, couplers, splitters, and numerous other suitable components may be included or coupled to optical communication system 10. The embodiment illustrated in FIG. 1 has only been offered for purposes of teaching and where appropriate may be inclusive of various other suitable components that facilitate the recovery or the restoration of one or more component or element failures.

Moreover, although FIG. 2 has been described with reference to specific configurations and particular component arrangements, any suitable circuitry may be provided in conjunction with optical amplifier 12 without departing from the scope of the present invention. Other appropriate resistive elements, as well as inductors, capacitors, and other suitable components may be included within the system of FIG. 2. These alternative circuitries may be used to provide, designate, or otherwise select specific pump laser parameters that may in turn influence operations associated with optical amplifier 12.

Additionally, although the present invention has been described with reference to pump lasers 18 and 20, numerous additional pump lasers may be provided to an associated optical network without departing from the teachings of the present invention. The implementation of two pump lasers has only been offered for purposes of example. Where appropriate, any suitable number of pump lasers (or other suitable optical energy generating elements) may be included within optical communication system 10 in accordance with particular needs.

Numerous other changes, substitutions, variations, alterations, and modifications may be ascertained by those skilled in the art and it is intended that the present invention encompass all such changes, substitutions, variations, alterations, and modifications as falling within the spirit and scope of the appended claims. Moreover, the present invention is not intended to be limited in any way by any statement in the specification that is not otherwise reflected in the appended claims.

What is claimed is:

1. An apparatus for proportional control of a plurality of pump lasers, comprising:
   an optical amplifier;
   a first pump laser coupled to the optical amplifier;
   a second pump laser coupled to the optical amplifier, wherein the first and second pump lasers are operable to collectively provide optical power to the optical amplifier such that a desired gain is achieved by the optical amplifier; and
   feedback circuitry coupled to the optical amplifier and the first and second pump lasers, the feedback circuitry operable to adjust an optical power output of one of the first and second pump lasers in response to a failure associated with the other one of the first and second pump lasers in order to maintain the desired gain of the optical amplifier.

2. The apparatus of claim 1, further comprising:
   a first memory element included within the first pump laser; and
   a second memory element included within the second pump laser, each of the first and second memory elements being operable to set a limit on a current level provided to each of the first and second pump lasers respectively, wherein the current levels are based on data stored in each of the first and second memory elements.

3. The apparatus of claim 2, further comprising:
   a first current limiter coupled to the first pump laser and operable to manage a first current level provided to the first pump laser; and
   a second current limiter coupled to the second pump laser and operable to manage a second current level provided to the second pump laser, wherein each of the first and second current limiters are operable to be programmed using information that is included within a selected one of the first and second memory elements.

4. The apparatus of claim 1, further comprising:
   a first assembly coupled to the first pump laser and operable to provide a support for the first pump laser; and
   a second assembly coupled to the second pump laser and operable to provide a support for the second pump laser, wherein each of the first and second assemblies provide a removal capability to the first and second pump lasers such that each may be removed while the optical amplifier is in operation.

5. The apparatus of claim 1, wherein the feedback circuitry is operable to substantially maintain the desired gain associated with the optical amplifier by controlling a voltage potential provided to a selected one or more inputs of the optical amplifier from the first and second pump lasers.

6. The apparatus of claim 1, wherein the feedback circuitry includes:
   an automatic gain control operable to compute an amplifier gain value associated with the optical amplifier, wherein the automatic gain control is operable to compare the amplifier gain value to the desired gain, the automatic gain control operable to adjust one or more currents supplied to each of the first and second pump lasers in order for the amplifier gain value to substantially conform to the desired gain.

7. The apparatus of claim 6, wherein the feedback circuitry includes:
   an optical gain block coupled to each of the first and second pump lasers and the automatic gain control, wherein the optical gain block is operable to monitor power values provided to each of the first and second pump lasers and to communicate the power values to the automatic gain control such that the automatic gain control may adjust the power values in order to attain a targeted power value input for the optical amplifier from the first and second pump lasers.

8. The apparatus of claim 1, wherein the optical amplifier comprises a semiconductor material that is doped with erbium.

9. A method for controlling an operation associated with a plurality of pump lasers, comprising:
   providing optical power to an optical amplifier from a first and a second pump laser, the optical power provided being used as a basis for generating a gain associated with the optical amplifier;
   identifying an error associated with the first pump laser; and
   controlling one or more parameters associated with the second pump laser in response to the error such that the second pump laser increases its optical power provided to the optical amplifier, the change in optical power provided by the second pump laser being used by the optical amplifier to substantially maintain the gain associated with the optical amplifier.

10. The method of claim 9, further comprising:
adjusting the gain associated with the optical amplifier based on a power characteristic associated with each of the first and second pump lasers.

11. The method of claim 9, further comprising:
designating a limit on one or more current levels provided to each of the first and second pump lasers.

12. The method of claim 11, further comprising:
managing a first current level provided to the first pump laser and a second current level provided to the second pump laser.

13. The method of claim 9, further comprising:
supporting the first pump laser with a first assembly coupled thereto; and
supporting the second pump laser with a second assembly coupled thereto;
removing the first pump laser to address the failure;
maintaining operation of the optical amplifier with the second pump laser while the first pump laser is removed.

14. The method of claim 9, further comprising:
maintaining the gain associated with the optical amplifier by controlling a voltage potential provided to a selected one or more inputs of the optical amplifier from the first and second pump lasers.

15. The method of claim 9, further comprising:
computing an amplifier gain value associated with the optical amplifier;
comparing the amplifier gain value to the gain;
adjusting one or more currents supplied to each of the first and second pump lasers in order to substantially conform the amplifier gain value to the gain.

* * * * *